US012749216B2

(12) United States Patent
Tackin et al.

(10) Patent No.: US 12,749,216 B2
(45) Date of Patent: Sep. 29, 2026

(54) TECHNIQUES FOR TRACKING ONE OR MORE OBJECTS

(71) Applicant: Apple Inc., Cupertino, CA (US)

(72) Inventors: Onur E. Tackin, Saratoga, CA (US); Dhruv Samant, Mountain View, CA (US); Mahmut Demir, Dublin, CA (US); Samuel D. Post, Great Falls, MO (US)

(73) Assignee: APPLE INC., Cupertino, CA (US)

( * ) Notice: Subject to any disclaimer, the term of this patent is extended or adjusted under 35 U.S.C. 154(b) by 188 days.

(21) Appl. No.: 18/584,794

(22) Filed: Feb. 22, 2024

(65) Prior Publication Data

US 2024/0338842 A1 Oct. 10, 2024

Related U.S. Application Data

(60) Provisional application No. 63/494,983, filed on Apr. 7, 2023.

(51) Int. Cl.
*G06T 7/70* (2017.01)
*G06T 5/20* (2006.01)

(52) U.S. Cl.
CPC . *G06T 7/70* (2017.01); *G06T 5/20* (2013.01)

(58) Field of Classification Search
CPC .................................... G06T 7/70; G06T 5/20
See application file for complete search history.

(56) References Cited

U.S. PATENT DOCUMENTS

| | | | | |
|---|---|---|---|---|
| 6,499,025 | B1 * | 12/2002 | Horvitz | G06T 7/277 342/64 |
| 7,999,842 | B1 | 8/2011 | Barrus et al. | |
| 9,491,374 | B1 | 11/2016 | Avrahami et al. | |
| 9,554,090 | B1 | 1/2017 | Carter | |
| 9,612,123 | B1 * | 4/2017 | Levinson | B60Q 1/508 |
| 9,734,455 | B2 * | 8/2017 | Levinson | B60L 3/0007 |

(Continued)

FOREIGN PATENT DOCUMENTS

WO WO 2022/182507 A1 9/2022

OTHER PUBLICATIONS

Jiang et al., 2015, "Combining Passive Visual Cameras and Active IMU Sensors to Track Cooperative People" (pp. 1338-1345) (Year: 2015).*

(Continued)

*Primary Examiner* — Manav Seth
(74) *Attorney, Agent, or Firm* — Kyle B. Morse; BAKERHOSTETLER

(57) ABSTRACT

Some methods are described herein for tracking one or more objects. In some examples, the method is performed at a computer system. In some examples, the method includes receiving a first set of data corresponding to the object via a first modality and a second set of data corresponding to the object via a second modality; after receiving the first set of data corresponding to the object and the second set of data corresponding to the object, receiving a second set of image data representing the field of view of the camera, wherein the second set of image data does not include data representative of the object; and after receiving the second set of image data, predicting a position of the object using at least the first set of data corresponding to the object and the second set of data corresponding to the object.

24 Claims, 5 Drawing Sheets

(56) References Cited

U.S. PATENT DOCUMENTS

| | | | | |
|---|---|---|---|---|
| 10,134,146 | B2 * | 11/2018 | Saleemi | G06T 11/206 |
| 10,691,943 | B1 * | 6/2020 | Ferstl | G06N 3/08 |
| 11,195,291 | B1 | 12/2021 | Li et al. | |
| 11,315,262 | B1 * | 4/2022 | Cherevatsky | H04N 7/188 |
| 11,399,137 | B2 * | 7/2022 | Janjic | G06T 7/277 |
| 12,511,992 | B2 * | 12/2025 | Unzueta | G08G 1/0141 |
| 12,515,603 | B1 * | 1/2026 | Chebiyyam | B60R 21/0136 |
| 2006/0258289 | A1 | 11/2006 | Dua | |
| 2008/0129844 | A1 | 6/2008 | Cusack et al. | |
| 2008/0291271 | A1 | 11/2008 | Hansson et al. | |
| 2013/0029596 | A1 | 1/2013 | Preston et al. | |
| 2015/0050881 | A1 | 2/2015 | Chen et al. | |
| 2015/0127300 | A1 | 5/2015 | Bluming et al. | |
| 2016/0219241 | A1 | 7/2016 | Korneliussen et al. | |
| 2017/0251138 | A1 | 8/2017 | Yoon et al. | |
| 2018/0041686 | A1 | 2/2018 | Bostick et al. | |
| 2018/0098366 | A1 | 4/2018 | Cohn et al. | |
| 2019/0273871 | A1 * | 9/2019 | Chen | H04N 23/695 |
| 2019/0354361 | A1 | 11/2019 | Li et al. | |
| 2021/0192199 | A1 | 6/2021 | Bagwell et al. | |
| 2021/0233260 | A1 * | 7/2021 | Chakravarty | G06T 7/285 |
| 2021/0265860 | A1 | 8/2021 | Hamlin et al. | |
| 2022/0164611 | A1 | 5/2022 | Seguin et al. | |
| 2022/0294271 | A1 | 9/2022 | Li et al. | |
| 2022/0331047 | A1 * | 10/2022 | Shelton, IV | G06T 11/00 |
| 2022/0405959 | A1 | 12/2022 | Forutanpour et al. | |
| 2023/0029764 | A1 | 2/2023 | Lum | |
| 2023/0044279 | A1 | 2/2023 | Lu | |
| 2023/0144091 | A1 | 5/2023 | Forutanpour et al. | |
| 2023/0153963 | A1 | 5/2023 | Zhang et al. | |
| 2023/0262317 | A1 | 8/2023 | O'Leary et al. | |
| 2023/0308603 | A1 | 9/2023 | Nicholson et al. | |
| 2024/0062519 | A1 | 2/2024 | Al Faruque et al. | |
| 2024/0292188 | A1 * | 8/2024 | Gottumukkala | G01S 1/02 |

OTHER PUBLICATIONS

Erdem et al., 2015, "Fusing Inertial Sensor Data in an Extended Kalman Filter for 3D Camera Tracking" (pp. 538-548). (Year: 2015).*

Pham, 2017, "Improvement of Person Tracking Accuracy in Camera Network by Fusing WiFi and Visual Information" (pp. 133-148) (Year: 2017).*

Han et al., 2021, "Cross-Modality Person Re-Identification Based on Heterogeneous Center Loss and Non-Local Features" (pp. 1-10) (Year: 2021).*

Kim et al., 2021, "Data Fusion of radar and image measurements for multi-object tracking via Kalman Filter" (pp. 641-652) (Year: 2014).*

Farag, 2020, "Kalman-filter-based sensor fusion applied to road-objects detection and tracking for autonomous vehicles" (pp. 1-14) (Year: 2020).*

International Search Report and Written Opinion from PCT/US2023/033415, dated Dec. 18, 2023; 11 pages.

International Patent Application No. PCT/US2025/010109; Invitation to Pay Add'l Fees; dated Apr. 10, 2025; 11 pages.

U.S. Appl. No. 18/370,349; Non-Final Office Action; dated May 5, 2025; 13 pages.

International Patent Application No. PCT/US2025/010109; Int'l Search Report and the Written Opinion; dated Jun. 3, 2025; 19 pages.

U.S. Appl. No. 63/371,459, filed Aug. 15, 2022, Al Faruque et al.

International Patent Application No. PCT/US2025/020974; Invitation to Pay Add'l Fees; dated Jun. 25, 2025; 11 pages.

Farin et al.; "Minimizing MPEG-4 Sprite Coding-Cost Using Multiple-Sprites"; Visual Communications and Image Processing; vol. 5308; 2004; p. 234-245.

Sikora et al.; "Trends and Perspectives in Image and Video Coding"; Proceeding of the IEEE; vol. 93 No. 1; Jan. 2005; p. 6-17.

Young et al.; "Immersive Telepresence and Remote Collaboration using Mobile and Wearable Devices"; IEEE Transactions on Visualization and Computer Graphics; vol. 25 No. 5; May 2019; p. 1908-1918.

Muller et al.; "PanoVC: Pervasive Telepresence using Mobile Phones"; IEEE Int'l Conf. on Pervasive Computing and Communications; 2016; 10 pages.

Pece et al.; "PanoInserts: Mobile Spatial Teleconferencing"; CHI: Changing and Perspectives; Session: Video Communication; Apr. 2013; p. 1319-1328.

International Patent Application No. PCT/US2025/020974; Int'l Search Report and the Written Opinion; dated Aug. 18, 2025; 19 pages.

U.S. Appl. No. 18/370,348; Non-Final Office action; dated Sep. 10, 2025; 20 pages.

U.S. Appl. No. 18/407,221; Non-Final Office Action; dated Oct. 20, 2025; 20 pages.

U.S. Appl. No. 18/370,348; Final Office Action; dated Feb. 24, 2026; 22 pages.

U.S. Appl. No. 18/407,221; Non-Final Office Action; dated Apr. 6, 2026; 12 pages.

* cited by examiner

TECHNIQUES FOR TRACKING ONE OR MORE OBJECTS

CROSS-REFERENCE TO RELATED APPLICATIONS

The present application claims priority to U.S. Provisional Patent Application Ser. No. 63/494,983, entitled "Techniques for Tracking One or More Objects," filed Apr. 7, 2023, which is hereby incorporated by reference in its entirety for all purposes.

BACKGROUND

Conventional tracking techniques are becoming increasingly more sophisticated and commonplace. However, conventional tracking techniques often output inaccurate and/or incomplete tracking predictions based on incomplete and/or inaccurate data. Accordingly, there is a need to improve techniques for tracking one or more objects.

SUMMARY

Current techniques for tracking one or more objects are generally ineffective and/or inefficient. For example, some techniques rely on incomplete and/or missing data to track an object within a physical environment. This disclosure provides more effective and/or efficient techniques for tracking one or more objects by fusing together data from multiple modalities. It should be recognized that other types of electronic devices can be used with techniques described herein. For example, a smartwatch can connect with one or more cameras using techniques described herein. In addition, techniques optionally complement or replace other techniques for tracking one or more objects.

In some examples, a method that is performed by a computer system is described. In some examples, the method comprises: receiving, via a camera that is in communication with a computer system, a first set of image data representing a field of view of the camera, wherein the first set of image data at least includes data representative of an object in the field of view of the camera; receiving a first set of data corresponding to the object via a first modality and a second set of data corresponding to the object via a second modality; after receiving the first set of data corresponding to the object and the second set of data corresponding to the object, receiving a second set of image data representing the field of view of the camera, wherein the second set of image data does not include data representative of the object; and after receiving the second set of image data, predicting a position of the object using at least the first set of data corresponding to the object and the second set of data corresponding to the object.

In some examples, a non-transitory computer-readable storage medium storing one or more programs configured to be executed by one or more processors of a computer system is described. In some examples, the one or more programs includes instructions for: receiving, via a camera that is in communication with a computer system, a first set of image data representing a field of view of the camera, wherein the first set of image data at least includes data representative of an object in the field of view of the camera; receiving a first set of data corresponding to the object via a first modality and a second set of data corresponding to the object via a second modality; after receiving the first set of data corresponding to the object and the second set of data corresponding to the object, receiving a second set of image data representing the field of view of the camera, wherein the second set of image data does not include data representative of the object; and after receiving the second set of image data, predicting a position of the object using at least the first set of data corresponding to the object and the second set of data corresponding to the object.

In some examples, a transitory computer-readable storage medium storing one or more programs configured to be executed by one or more processors of a computer system is described. In some examples, the one or more programs includes instructions for: receiving, via a camera that is in communication with a computer system, a first set of image data representing a field of view of the camera, wherein the first set of image data at least includes data representative of an object in the field of view of the camera; receiving a first set of data corresponding to the object via a first modality and a second set of data corresponding to the object via a second modality; after receiving the first set of data corresponding to the object and the second set of data corresponding to the object, receiving a second set of image data representing the field of view of the camera, wherein the second set of image data does not include data representative of the object; and after receiving the second set of image data, predicting a position of the object using at least the first set of data corresponding to the object and the second set of data corresponding to the object.

In some examples, a computer system comprising one or more processors and memory storing one or more program configured to be executed by the one or more processors is described. In some examples, the one or more programs includes instructions for: receiving, via a camera that is in communication with a computer system, a first set of image data representing a field of view of the camera, wherein the first set of image data at least includes data representative of an object in the field of view of the camera; receiving a first set of data corresponding to the object via a first modality and a second set of data corresponding to the object via a second modality; after receiving the first set of data corresponding to the object and the second set of data corresponding to the object, receiving a second set of image data representing the field of view of the camera, wherein the second set of image data does not include data representative of the object; and after receiving the second set of image data, predicting a position of the object using at least the first set of data corresponding to the object and the second set of data corresponding to the object.

In some examples, a computer system is described. In some examples, the computer system comprises means for performing each of the following steps: receiving, via a camera that is in communication with a computer system, a first set of image data representing a field of view of the camera, wherein the first set of image data at least includes data representative of an object in the field of view of the camera; receiving a first set of data corresponding to the object via a first modality and a second set of data corresponding to the object via a second modality; after receiving the first set of data corresponding to the object and the second set of data corresponding to the object, receiving a second set of image data representing the field of view of the camera, wherein the second set of image data does not include data representative of the object; and after receiving the second set of image data, predicting a position of the object using at least the first set of data corresponding to the object and the second set of data corresponding to the object.

In some examples, a computer program product is described. In some examples, the computer program product comprises one or more programs configured to be executed by one or more processors of a computer system. In some examples, the one or more programs include instructions for: receiving, via a camera that is in communication with a computer system, a first set of image data representing a field of view of the camera, wherein the first set of image data at least includes data representative of an object in the field of view of the camera; receiving a first set of data corresponding to the object via a first modality and a second set of data corresponding to the object via a second modality; after receiving the first set of data corresponding to the object and the second set of data corresponding to the object, receiving a second set of image data representing the field of view of the camera, wherein the second set of image data does not include data representative of the object; and after receiving the second set of image data, predicting a position of the object using at least the first set of data corresponding to the object and the second set of data corresponding to the object.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1:
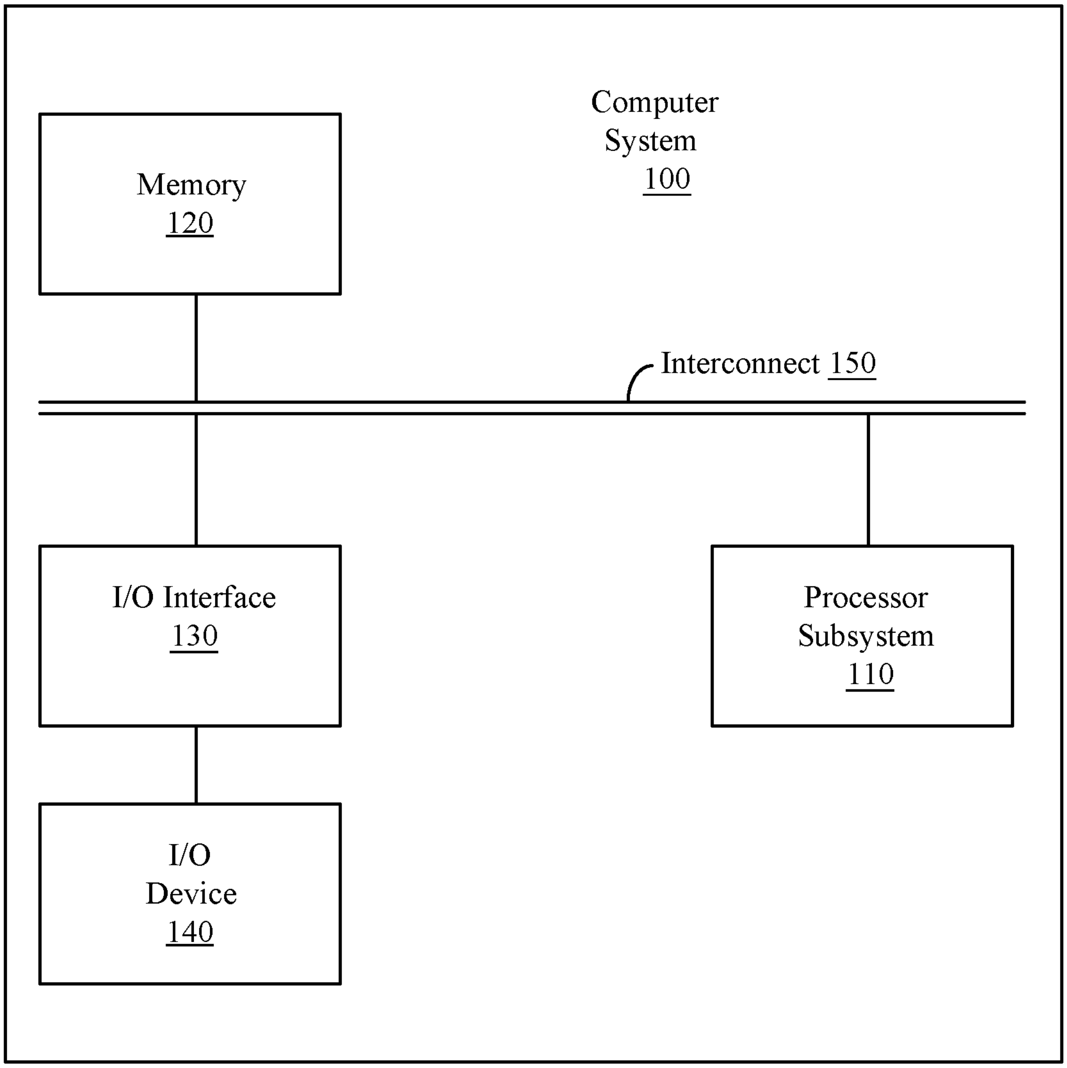
FIG. 1 is a block diagram illustrating a computer system, in accordance with some examples.

The following description sets forth exemplary methods, parameters, and the like. It should be recognized, however, that such description is not intended as a limitation on the scope of the present disclosure but is instead provided as a description of exemplary embodiments.

Methods described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of system or computer readable medium claims where the system or computer readable medium claims include instructions for performing one or more steps that are contingent upon one or more conditions being satisfied. Because the instructions for the system or computer readable medium claims are stored in one or more processors and/or at one or more memory locations, the system or computer readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, a system or computer readable storage medium can repeat the steps of a method as many times as needed to ensure that all of the contingent steps have been performed.

Although the following description uses terms "first," "second," etc. to describe various elements, these elements should not be limited by the terms. In some examples, these terms are used to distinguish one element from another. For example, a first subsystem could be termed a second subsystem, and, similarly, a subsystem device could be termed a subsystem device, without departing from the scope of the various described embodiments. In some examples, the first subsystem and the second subsystem are two separate references to the same subsystem. In some examples, the first subsystem and the second subsystem are both subsystems, but they are not the same subsystem or the same type of subsystem.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," or "in accordance with a determination that [the stated condition or event]" depending on the context.

Turning to FIG. 1, a block diagram of computer system 100 is illustrated. Computer system 100 is a non-limiting example of a computer system that can be used to perform functionality described herein. It should be recognized that other computer architectures of a computer system can be used to perform functionality described herein.

In the illustrated example, computer system 100 includes processor subsystem 110 communicating with (e.g., wired or wirelessly) memory 120 (e.g., a system memory or external memory) and I/O interface 130 via interconnect 150 (e.g., a system bus, one or more memory locations, or other communication channel for connecting multiple components of computer system 100). In addition, I/O interface 130 is communicating with (e.g., wired or wirelessly) to I/O device 140. In some examples, I/O interface 130 is included with I/O device 140 such that the two are a single component. It should be recognized that there can be one or more I/O interfaces, with each I/O interface communicating with one or more I/O devices. In some examples, multiple instances of processor subsystem 110 can be communicating via interconnect 150.

Computer system 100 can be any of various types of devices, including, but not limited to, a system on a chip, a server system, a personal computer system (e.g., a smartphone, a smartwatch, a wearable device, a tablet, a laptop computer, and/or a desktop computer), a sensor, or the like. In some examples, computer system 100 is included or communicating with a physical component for the purpose of modifying the physical component in response to an instruction. In some examples, computer system 100 receives an instruction to modify a physical component and, in response to the instruction, causes the physical component to be modified. In some examples, the physical component is modified via an actuator, an electric signal, and/or algorithm. Examples of such physical components include an acceleration control, a break, a gear box, a hinge, a motor, a pump, a refrigeration system, a spring, a suspension system, a steering control, a pump, a vacuum system, and/or a valve. In some examples, a sensor includes one or more hardware components that detect information about a physical environment in proximity to (e.g., surrounding or within a threshold distance of the sensor) the sensor. In some examples, a hardware component of a sensor includes a sensing component (e.g., an image sensor or temperature sensor), a transmitting component (e.g., a laser or radio transmitter), a receiving component (e.g., a laser or radio receiver), or any combination thereof. Examples of sensors include an angle sensor, a chemical sensor, a brake pressure sensor, a contact sensor, a non-contact sensor, an electrical sensor, a flow sensor, a force sensor, a gas sensor, a humidity sensor, an image sensor (e.g., a camera sensor, a radar sensor, and/or a LiDAR sensor), an inertial measurement unit, a leak sensor, a level sensor, a light detection and ranging system, a metal sensor, a motion sensor, a particle sensor, a photoelectric sensor, a position sensor (e.g., a global positioning system or eddy current sensor), a precipitation sensor, a pressure sensor, a proximity sensor, a radio detection and ranging system, a radiation sensor, a speed sensor (e.g., measures the speed of an object), a temperature sensor, a time-of-flight sensor, a torque sensor, and an ultrasonic sensor. In some examples, a sensor includes a combination of multiple sensors. In some examples, sensor data is captured by fusing data from one sensor with data from one or more other sensors. Although a single computer system is shown in FIG. 1, computer system 100 can also be implemented as two or more computer systems operating together.

In some examples, processor subsystem 110 includes one or more processors or processing units configured to execute program instructions to perform functionality described herein. For example, processor subsystem 110 can execute an operating system, a middleware system, one or more applications, or any combination thereof.

In some examples, the operating system manages resources of computer system 100. Examples of types of operating systems covered herein include batch operating systems (e.g., Multiple Virtual Storage (MVS)), time-sharing operating systems (e.g., Unix, Multics, or Linux), distributed operating systems (e.g., Solaris, Micros, or Advanced Interactive executive (AIX)), network operating systems (e.g., Microsoft Windows Server or Unix OS), and real-time operating systems (e.g., QNX or VxWorks). In some examples, the operating system includes various procedures, sets of instructions, software components, and/or drivers for controlling and managing general system tasks (e.g., memory management, storage device control, power management, or the like) and for facilitating communication between various hardware and software components. In some examples, the operating system uses a priority-based scheduler that assigns a priority to different tasks that processor subsystem 110 can execute. In such examples, the priority assigned to a task is used to identify a next task to execute. In some examples, the priority-based scheduler identifies a next task to execute when a previous task finishes executing. In some examples, the highest priority task runs to completion unless another higher priority task is made ready.

In some examples, the middleware system provides one or more services and/or capabilities to applications (e.g., the one or more applications running on processor subsystem 110) outside of what the operating system offers (e.g., data management, application services, messaging, authentication, API management, or the like). In some examples, the middleware system is designed for a heterogeneous computer cluster to provide hardware abstraction, low-level device control, implementation of commonly used functionality, message-passing between processes, package management, or any combination thereof. Examples of middleware systems include Lightweight Communications and Marshalling (LCM), PX4, Robot Operating System (ROS), and ZeroMQ. In some examples, the middleware system represents processes and/or operations using a graph architecture, where processing takes place in nodes that can receive, post, and multiplex sensor data messages, control messages, state messages, planning messages, actuator messages, and other messages. In such examples, the graph architecture can define an application (e.g., an application executing on processor subsystem 110 as described above) such that different operations of the application are included with different nodes in the graph architecture.

In some examples, a message sent from a first node in a graph architecture to a second node in the graph architecture is performed using a publish-subscribe model, where the first node publishes data on a channel in which the second node can subscribe. In such examples, the first node can store data in memory (e.g., memory 120 or some local memory of processor subsystem 110) and notify the second node that the data has been stored in the memory. In some examples, the first node notifies the second node that the data has been stored in the memory by sending a pointer (e.g., a memory pointer, such as an identification of a memory location) to the second node so that the second node can access the data from where the first node stored the data. In some examples, the first node would send the data directly to the second node so that the second node would not need to access a memory based on data received from the first node.

Memory 120 can include a computer readable medium (e.g., non-transitory or transitory computer readable medium) usable to store (e.g., configured to store, assigned to store, and/or that stores) program instructions executable by processor subsystem 110 to cause computer system 100 to perform various operations described herein. For example, memory 120 can store program instructions to implement the functionality associated with methods 800, 900, 1000, 11000, 12000, 1300, 1400, and 1500 described below.

Memory 120 can be implemented using different physical, non-transitory memory media, such as hard disk storage, floppy disk storage, removable disk storage, flash memory, random access memory (e.g., RAM-SRAM, EDO RAM, SDRAM, DDR SDRAM, RAMBUS RAM, or the like), read only memory (PROM, EEPROM, or the like), or the like. Memory in computer system 100 is not limited to primary storage such as memory 120. Computer system 100 can also include other forms of storage such as cache memory in processor subsystem 110 and secondary storage on I/O device 140 (e.g., a hard drive, storage array, etc.). In some examples, these other forms of storage can also store program instructions executable by processor subsystem 110 to perform operations described herein. In some examples, processor subsystem 110 (or each processor within processor subsystem 110) contains a cache or other form of on-board memory.

I/O interface 130 can be any of various types of interfaces configured to communicate with other devices. In some examples, I/O interface 130 includes a bridge chip (e.g., Southbridge) from a front-side bus to one or more back-side buses. I/O interface 130 can communicate with one or more I/O devices (e.g., I/O device 140) via one or more corresponding buses or other interfaces. Examples of I/O devices include storage devices (e.g., hard drive, optical drive, removable flash drive, storage array, SAN, or their associated controller), network interface devices (e.g., to a local or wide-area network), sensor devices (e.g., camera, radar, LiDAR, ultrasonic sensor, GPS, inertial measurement device, or the like), and auditory or visual output devices (e.g., speaker, light, screen, projector, or the like). In some examples, computer system 100 is communicating with a network via a network interface device (e.g., configured to communicate over Wi-Fi, Bluetooth, Ethernet, or the like). In some examples, computer system 100 is directly or wired to the network.

Figure 2:
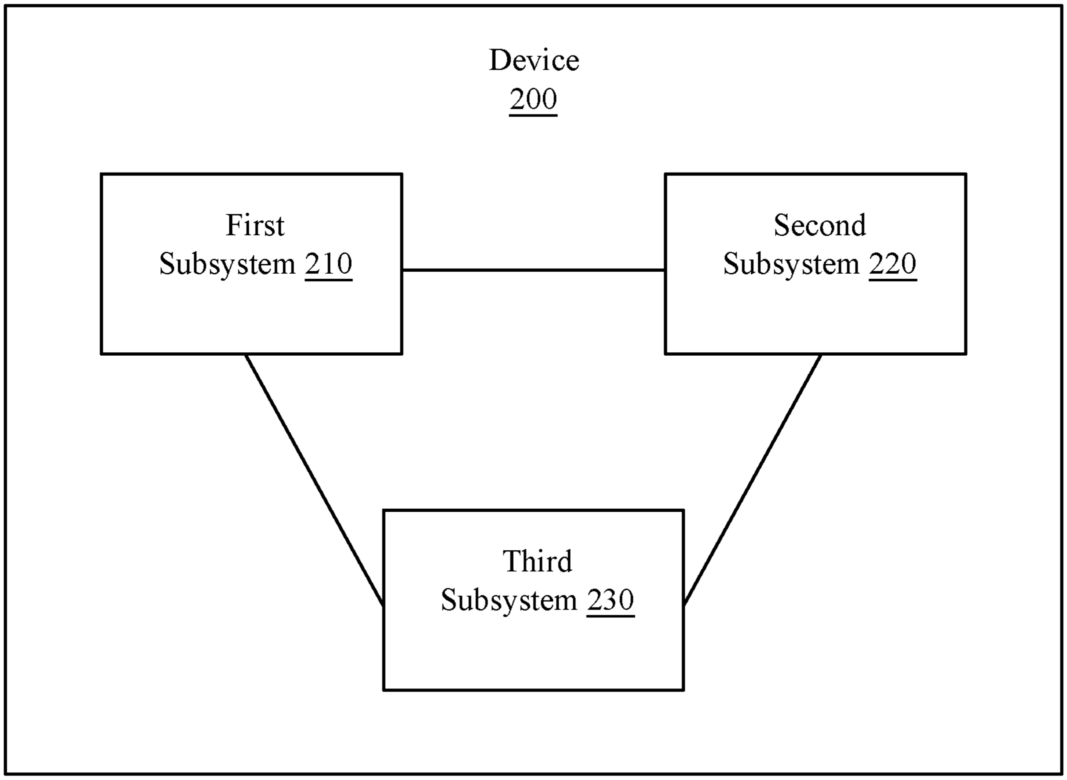
FIG. 2 is a block diagram illustrating a device with interconnected subsystems, in accordance with some examples.

FIG. 2 illustrates a block diagram of device 200 with interconnected subsystems. In the illustrated example, device 200 includes three different subsystems (e.g., first subsystem 210, second subsystem 220, and third subsystem 230) communicating with (e.g., wired or wirelessly) each other, creating a network (e.g., a personal area network, a local area network, a wireless local area network, a metropolitan area network, a wide area network, a storage area network, a virtual private network, an enterprise internal private network, a campus area network, a system area network, and/or a controller area network). An example of a possible computer architecture of a subsystem as included in FIG. 2 is described in FIG. 1 (e.g., computer system 100). Although three subsystems are shown in FIG. 2, device 200 can include more or fewer subsystems.

In some examples, some subsystems are not connected to other subsystem (e.g., first subsystem 210 can be connected to second subsystem 220 and third subsystem 230 but second subsystem 220 cannot be connected to third subsystem 230). In some examples, some subsystems are connected via one or more wires while other subsystems are wirelessly connected. In some examples, messages are set between the first subsystem 210, second subsystem 220, and third subsystem 230, such that when a respective subsystem sends a message the other subsystems receive the message (e.g., via a wire and/or a bus). In some examples, one or more subsystems are wirelessly connected to one or more computer systems outside of device 200, such as a server system. In such examples, the subsystem can be configured to communicate wirelessly to the one or more computer systems outside of device 200.

In some examples, device 200 includes a housing that fully or partially encloses subsystems 210-230. Examples of device 200 include a home-appliance device (e.g., a refrigerator or an air conditioning system), a robot (e.g., a robotic arm or a robotic vacuum), and a vehicle. In some examples, device 200 is configured to navigate (with or without user input) in a physical environment.

In some examples, one or more subsystems of device 200 are used to control, manage, and/or receive data from one or more other subsystems of device 200 and/or one or more computer systems remote from device 200. For example, first subsystem 210 and second subsystem 220 can each be a camera that captures images, and third subsystem 230 can use the captured images for decision making. In some examples, at least a portion of device 200 functions as a distributed computer system. For example, a task can be split into different portions, where a first portion is executed by first subsystem 210 and a second portion is executed by second subsystem 220.

Attention is now directed towards techniques for tracking one or more objects. Such techniques are described in the context of a filter receiving data from one or more modalities to track the one or more objects. In some examples, the filter is a Kalman filter or another type of filter for prediction and/or estimation. In particular, the techniques described below track one or more objects (e.g., an individual, an animal, an automobile, a boat, and/or a robot (e.g., a vacuum, a plow, and/or another type of appliance)), by fusing data together from different modalities to predict a future position of the object. The fused data includes data from one or more modalities, such as a camera, a microphone, and/or data from an inertial measurement unit (e.g., IMU) of a camera. It should be recognized that different types of filters can be used with techniques described herein. In some examples, a Kalman filter (and, in some of these examples, an extended Kalman filter or unscented Kalman filter) and/or a particle filter can receive data from one or more modalities to track an object using techniques described herein.

In some examples, the techniques described herein optionally complement or replace other techniques for tracking one or more objects. For example, conventional tracking techniques (e.g., tracking techniques that employ machine learning models) are resource intensive and often result in incomplete and/or missing data because of environmental conditions (e.g., bad lighting, objects in environment blocking the view of the tracked object, etc.). In some examples, conventional tracking techniques rely solely and/or heavily on tracking an object via one modality in favor of other modalities. Therefore, in some examples, when a favorable modality is not able accurately track a respective object (e.g., such as when the object is obscured in the field-of-view of a camera, when the camera is the favorable modality), the ability of the system to track the favorable object is reduced for a period of time (e.g., period of time that the respective object is obscured). In some examples, the reduction of the ability of the system to track the favorable object can result in operations being performed at undesired times and/or unfavorable operations to be performed. The below described techniques supplement conventional tracking techniques such that the amount of incomplete and/or missing data is reduced and the computational resources required is reduced. Further, the below described techniques aid in filtering out noisy measurements and/or wrong measurements that occur in conventional tracking techniques.

Figure 3:
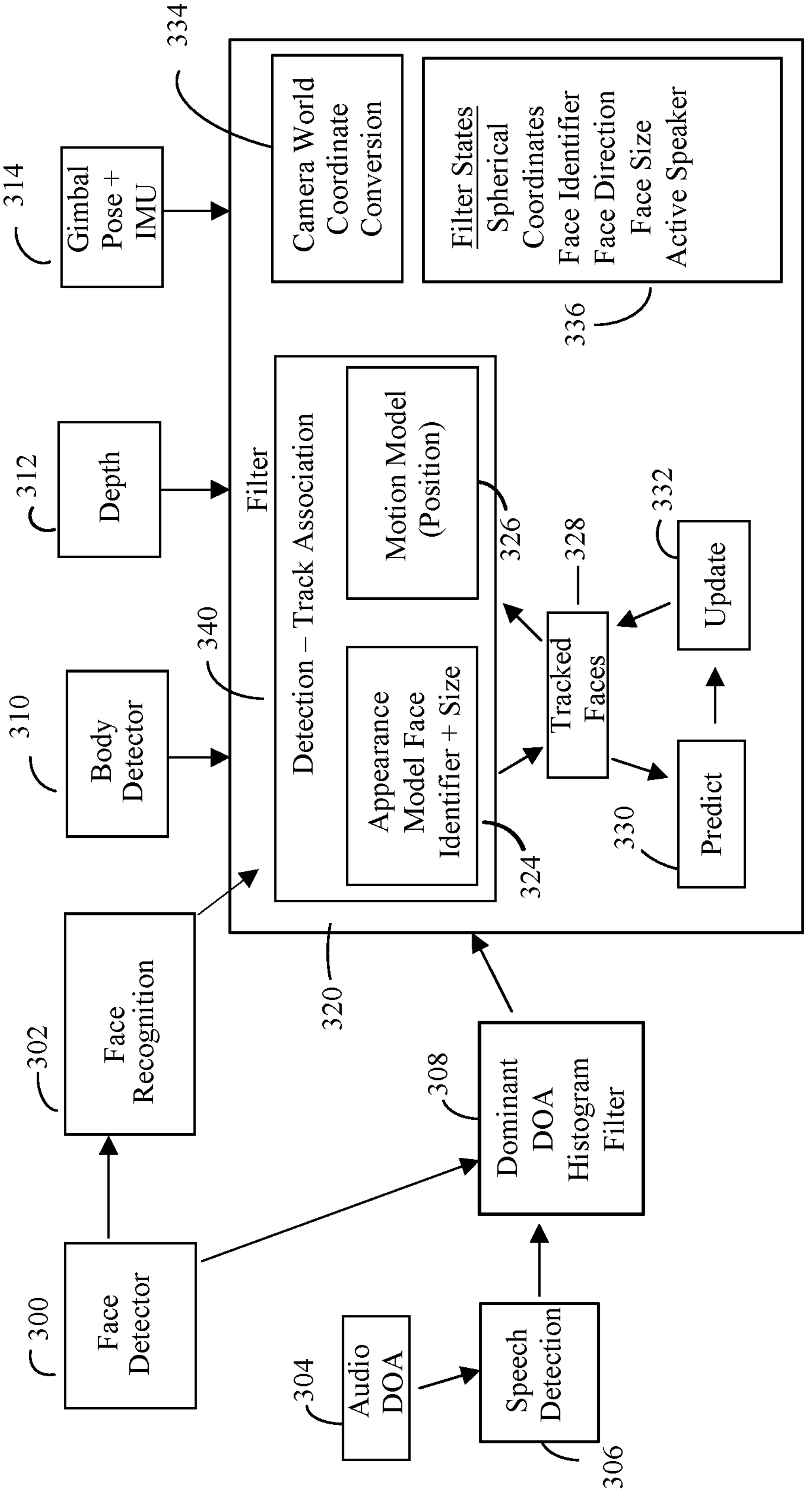
FIG. 3 is a block diagram illustrating a filter that is in communication with multiple modalities, in accordance with some examples.

FIG. 3 is a block diagram illustrating the various hardware components and modules used to track one or more objects using data from multiple modalities. FIG. 3 illustrates extended Kalman filter 320. Extended Kalman filter 320 is integrated into a computer system that includes, at least, one or more camera hardware components (e.g., cameras capable of capturing still images and/or video) and/or one or more microphone hardware components. In some examples, the computer system (e.g., and/or the one or more cameras) is coupled to a gimbal apparatus. In some examples, the computer system (e.g., and/or the one or more cameras) moves within a spherical coordinate system and does not have translational movement. In some examples, the computer system includes one or more components of computer system 100 and/or device 200 described above.

At FIG. 3, the computer system is tracking an object, which is an individual who is moving around within a physical environment. The computer system is tracking the object via data (e.g., pictures and/or video) that is captured via the one or more cameras. In some examples, the computer system moves translationally. In some examples, the computer system tracks the object that is positioned closest to the computer system. In some examples, computer system uses a different configuration than the one shown in FIG. 3 to perform the one or more operations described below and/or one or more components of FIG. 3 can be rerouted, replaced, and/or added with one or more components of FIG. 3 and/or one of more other components not shown in FIG. 3 to track objects using and/or aligned with the techniques described herein.

FIG. 3 illustrates face detector 300, body detector 310, depth module 312, and gimbal pose and inertial measurement unit 314. Body detector 310 captures, via the one or more cameras, positional data with respect to the body (e.g., the upper torso, lower torso, entire length, and/or legs of the tracked object) of the tracked object. Face detector 300 captures, via the one or more cameras, positional data with respect to the face (e.g., the entire face and/or a portion of the face, such as an eye region, a nose region, and/or a mouth region) of the tracked object. Data from face detector 300 is input into face recognition module 302, which, as described in greater detail below, assigns the data to a respective object. Data from each of body detector 310 and face detector 300 include x and y coordinates of a center of a bounding box of the data object. The x and y coordinates of the center of the bounding box are input into extended Kalman filter 320. In some examples, data from face detector 300 and body detector 310 is representative of only the positional coordinates of the bounding box. Although face detector 300 and body detector 310 are described as being used to capture data, in some examples, a camera that is able to capture data in other dimensions, such as a three-dimensional camera system is used to capture data concerning the face and/or body of a person. In some examples, face detector 300 and body detector 310 are the same camera; and in other examples, face detector 300 and body detector 310 are different cameras. In some examples, face detector and/or body detector provides a two-dimensional bounding box to the detect the face and/or body of a person.

Depth module 312 includes depth data of the tracked object (e.g., data with respect to the distance between the computer system and the tracked object) that is inferred from the data captured via face detector 300. Depth module 312 inputs the depth data into extended Kalman filter 320. Gimbal pose and inertial measurement unit 314 inputs positional data of the gimbal that the camera is in communication with into extended Kalman filter 320. In some examples, data captured from body detector 310 and data captured from face detector 300 is captured from the same camera. In some examples, the positional data includes the x, y, and/or z components of the gimbal of the camera. In some examples, the positional data includes the yaw, pitch, and roll of the gimbal of the camera. In some examples, data captured from body detector 310 and data captured from face detector 300 is captured from separate cameras. In some examples, data from face detector 300 is input into extended Kalman filter 320 and data from the body detector 310 is input into extended Kalman filter 320. In some examples, one or more of data from face detector 300 and data from body detector 310 is not input into extended Kalman filter 320 based on a determination being made that the torso of the tracked object is not within the field of view of body detector 310 and/or the torso of the tracked object is obscured from the view of body detector 310.

FIG. 3 also illustrates audio direction of arrival 304, speech detection module 306, and dominant direction of audio histogram filter module 308. Audio direction of arrival 304 processes audio data captured by the one or more microphones of the computer system and indicates a spectrum of angular positions (e.g., a spectrum across a range of degrees (0°-360°)) with respect to the position of the audio source (e.g., the tracked object) relative to the computer system. Speech detection module 306 deciphers whether the captured audio included speech and/or whether a particular user generated the audio and/or speech. In some examples, based on a determination being made the captured audio is not speech made by a person, the data is not passed to and/or processed by audio histogram filter module 308. In some examples, based on a determination being made the captured audio is speech made by a person, the data is passed to and/or processed by audio histogram filter module 308. In some examples, the data is passed to and/or processed by audio histogram filter module 308, irrespective of a determination of whether the captured audio included speech.

Data from audio direction of arrival 304 is input into dominant direction of audio histogram filter module 308. Dominant direction of audio histogram filter module 308 is a histogram filter, which processes the spectrum of measurements from audio direction of arrival 304 and provides a singular angular direction of the audio source (e.g., the singular angular direction includes the azimuth of the audio source and the direction of the audio source relative to the computer system). Dominant direction of audio histogram filter module 308 inputs the singular angular direction of the audio source into extended Kalman filter 320. In some examples, data from body detector 310, depth module 312, gimbal pose and inertial measurement unit 314, audio direction of arrival 304, face recognition module 302, and dominant direction of audio histogram filter module 308 are input into a particle filter. In some examples, data from body detector 310, depth module 312, gimbal pose and inertial measurement unit 314, audio direction of arrival 304, face recognition module 302, and dominant direction of audio histogram filter module 308 are input into an unscented filter.

In some examples, data from different sets of modalities are input into extended Kalman filter 320 based on which modalities can collect data with respect to the positioning of the object. In some examples, data from a microphone is into extended Kalman filter 320 and data from body detector 310 is not input into extended Kalman filter 320 when the object is outside of the field of view of body detector 310. In some examples, data from body detector 310 and/or face detector 300 is input into extended Kalman filter 320 and data from a microphone is not input into extended Kalman filter 320 when the object is outside of the detection range of the microphone. In some examples, data from different sets of modalities are input into extended Kalman filter 320 irrespective of whether a particular modality can collect data with respect to the positioning of the object. In some examples, data from a first set of modalities is input into extended Kalman filter 320 based on a determination being made that a first period of time (e.g., 1-120 seconds) has elapsed since the tracked object was last detected by the computer system and data from a second set of modalities (e.g., that is different from the first set of modalities) is input into extended Kalman filter 320 based on a determination being made that a second period of time (e.g., 1-120 seconds) (e.g., that is different from the first period of time) has elapsed since the tracked object was last detected by the computer system. In examples when extended Kalman filter 320 receives data from either the first set of modalities and/or the second set of modalities after a period of time has elapsed since the tracked object was last detected, the received data is assigned a larger weight in comparison to previous data that is input into extended Kalman filter 320. In some examples, the weight that is assigned to the data from either the first set of modalities and/or the second set of modalities is based on the amount of time that has elapsed since the tracked object was last detected.

In some examples, the data that is input into extended Kalman filter 320 is assigned a weight (e.g., a level of confidence and/or a level of certainty) based on various factors and various methodologies. In some examples, the weight of the data from different modalities is calculated differently and/or independently. For example, the weight of the data that is input into extended Kalman Filter 320 from dominant direction of audio histogram filter module 308 is determined by calculating a variance of the data from dominant direction of audio histogram filter module 308. In some examples, the weight of the data that is input into extended Kalman filter 320 from face recognition module 302 and body detector 310 is determined using a machine learning network model. In some examples, the tracked object is also assigned a weight. In some examples, weight of the tracked object is determined based on the weights of the data from the various modalities and the time that has elapsed since extended Kalman Filter 320 last received a respective measurement of the tracked object. In some examples, extended Kalman filter 320 updates the position of the tracked object proportionally to the weight of data that is input into extended Kalman filter 320 and the weight of the tracked object. In some examples, the variance of the data captured by dominant direction of audio histogram filter module 308 and the confidence weight assigned to the data captured by dominant direction of audio histogram filter module 308 have an inverse relationship. In some examples, the variance of the data captured by dominant direction of audio histogram filter module 308 and the confidence weight assigned to the data captured by dominant direction of audio histogram filter module 308 have a direct relationship. In some embodiments, the weight of the data captured by dominant direction of audio histogram filter module 308 remains constant when the variance of the data input into extended Kalman filter 320 does not vary. In some examples, different weights are assigned to different modalities based on the context of the object (e.g., in the field of view of the one or more cameras and/or outside of the field of view of the one or more cameras) as well as the nature of the modality. In some examples, the computer system applies different weights to different modalities based on the context of the object to produce more reliable predictions by applying greater weights to data captured from modalities than are deemed to be more reliable at a particular instance of time. In some examples, data from a first modality is assigned a different weight (weight of confidence) than data from a second modality (e.g., the weight from the first modality is assigned a greater or less weight than data from the second modality). In some examples, a weight applied to the first modality is independent of a weight applied to the second modality, and/or vice-versa.

As illustrated in FIG. 3, extended Kalman filter 320 includes detected-track association module 340 and tracked faces module 328. Tracked faces module 328 includes data regarding one or more outstanding tracks within extended Kalman filter 320. That is, extended Kalman filter 320 processes data that corresponds to a single track of a single object or extended Kalman filter 320 processes data that corresponds to multiple tracks for multiple objects. As described above, the output of face recognition module 302 is input into detected-track association module 340. In some examples, a determination is made as to whether the new data from face recognition module 302 corresponds to an outstanding track within extended Kalman filter 320 or not. In examples, based on a determination that the new data does not correspond to an outstanding track, a new track is created. In some examples, detected-track association module 340 uses geometrical heuristics to make this determination.

Detected-track association module 340 includes appearance model 324 and motion model 326. Appearance model 324 includes data (e.g., identification data of a tracked individual (e.g., data that representative of the appearance of a respective individual that is being tracked and/or data representative of the size and/or coordinates of a bounding box of a tracked individual)) with respect to the identification of existing tracks within extended Kalman filter 320. Appearance model 324 also includes a face identification model and/or a torso identification model to associate the new measurements with existing tracks within extended Kalman filter. An analysis is performed on the new data from face recognition module 302 to determine whether the identification associated with the new data matches the identification of data that corresponds to an existing track within extended Kalman filter 320. Further, motion model 326 includes positional and velocity data with respect to existing tracks within extended Kalman filter 320. An analysis is performed on the new data from face recognition module 302 to determine whether the new data matches the positional data of an existing track within extended Kalman filter 320. Based on the results from the analysis performed by motion model 326 and appearance model 324, a determination is made whether the new data from face recognition module 302 corresponds to an outstanding track within extended Kalman filter 320. The new data is associated with an existing track based on a determination that the new data corresponds to the existing track. A new track is created based on a determination that the data from face recognition module 302 does not correspond to an existing track within extended Kalman filter 320.

As illustrated in FIG. 3, extended Kalman filter 320 includes prediction module 330 and update module 332. Prediction module 330 inputs data from tracked faces module 328 into a statistical motion model (e.g., a specific motion model (e.g., prediction module 330 uses a human motion model based on a determination that object being tracked is a human, and/or prediction module 330 uses a robot motion model based on a determination that the object being tracked is a robot)) to predict the future position of the tracked object. The output from prediction module 330 is input into update module 322. Update module 322 fuses the data from one or more of the above discussed modalities (e.g., data from body detector 310, depth module 312, gimbal pose and inertial measurement unit 314, audio direction of arrival 304 and/or face detector 300) and updates various states of a respective track within tracked faces module 328. In some examples, the gimbal system moves the camera system (e.g., and/or the one or more cameras) based on the predicted future position of the tracked object. In some examples, in accordance with a determination that the computer system is moving, the predicted position of the tracked object takes into account the movement of the computer system.

As illustrated in FIG. 3, extended Kalman filter 320 includes state representation module 336. State representation module 336 includes data that is representative of the state of the tracked object. For example, state representation module 336 includes data that is representative of the direction of the face of the tracked object, the size of the face of the tracked object, and/or identification of the tracked object. Measurements from the various modalities that are input into extended Kalman filter 320 update different states of a respective track. For example, data from dominant direction of audio histogram filter module 308 does not include information that corresponds to the depth of the object. Accordingly, data from dominant direction of audio histogram filter module 308 does not update the depth state of the object. Rather, data from dominant direction of audio histogram filter module 308 updates the orientation state of the tracked object.

As illustrated in FIG. 3, extended Kalman filter 320 also includes coordinate conversion module 334. As described above, the computer system (e.g., and the one or more cameras) is coupled to a gimbal system. Accordingly, the computer system (e.g., and the one or more cameras) does not have any translational movement. However, various state characteristics are tracked in a cartesian coordinate system (e.g., the world coordinate system). Coordinate conversion module 334 converts the data from gimbal pose and inertial measurement unit 314 that are captured in a spherical coordinate system into a cartesian coordinate system. In some examples, when it is desirable to track the object using the spherical coordinate system, coordinate conversion module 334 converts the various state characteristics that are tracked in the cartesian coordinate system to the spherical coordinate system using coordinate conversion module 334.

Figure 4:
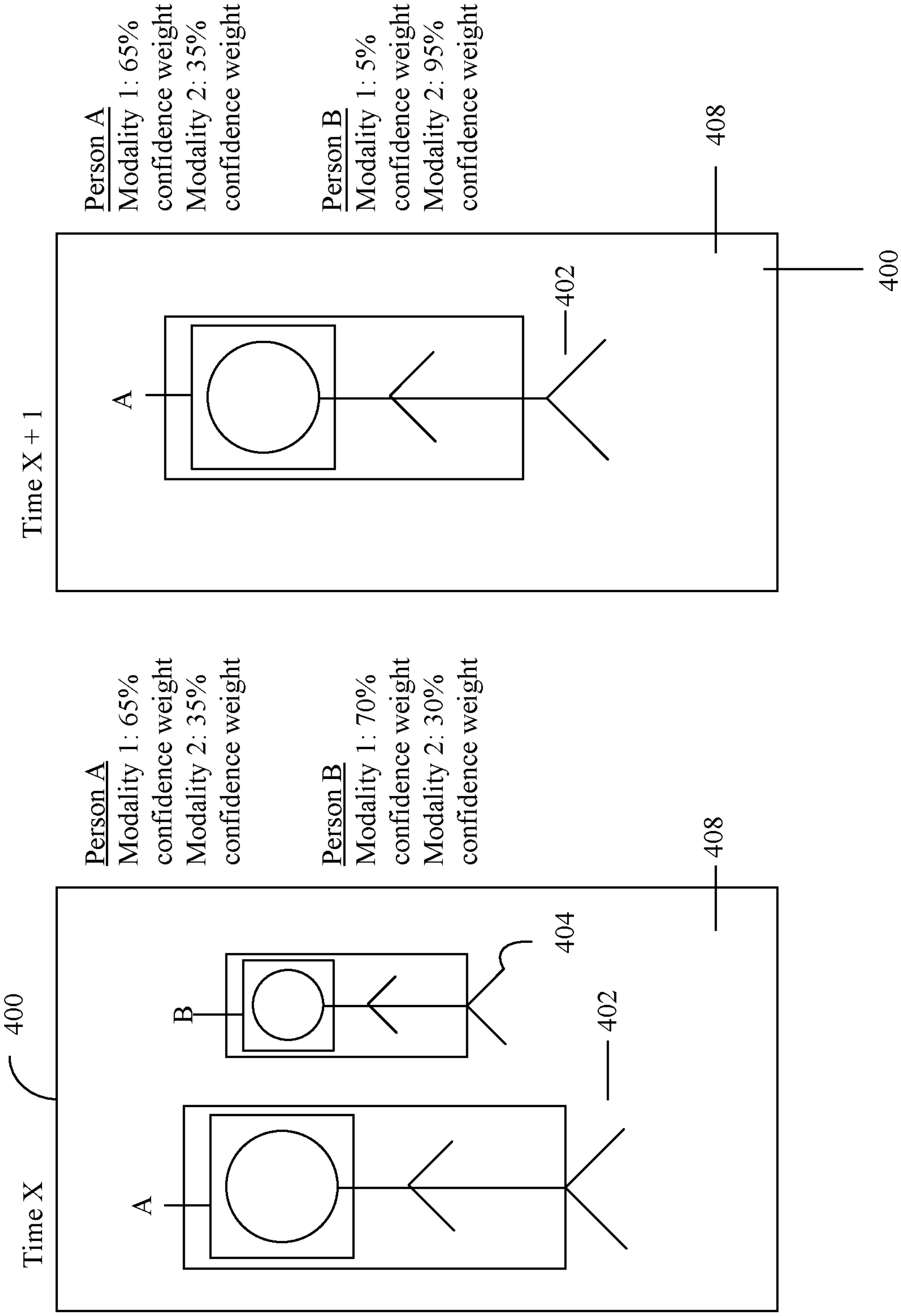
FIG. 4 illustrates an exemplary user interface for tracing one or more objects, in accordance with some examples.

FIG. 4 illustrates an exemplary user interface for tracking one or more objects, in accordance with some examples. In the left portion of FIG. 4, computer system 400 is tracking a first object (e.g., a first individual) and a second object (e.g., a second individual) via a camera modality (e.g., a body camera and/or a face camera) and a microphone modality at a first point in time (e.g., using one or more techniques discussed in relation to FIG. 3). In the left portion of FIG. 4, both the first object and the second object are positioned within the field of view of the one or more cameras (e.g., which correspond to the camera modality). Accordingly, in the left half of FIG. 4, computer system 600 displays representation of first object 402 and representation of second object 404 on display 408 of computer system 400. In the left portion of FIG. 4, with respect to the tracking of the first object, computer system 400 assigns a 65% confidence weight to data received from the camera modality and a 35% confidence weight to the data received from the microphone modality. Further, in the left portion of FIG. 4, with respect to the tracking of the second object, computer system 400 assigns a 70% confidence weight to the data received from the camera modality and a 30% confidence weight to the data received from the microphone modality. In FIG. 4, a box around solely the face of a person (e.g., user A and/or user B) indicates data tracking the face of a particular user (e.g., using face detector 300 and face recognition module 302 as described above) while a box around the torso and the face of the user indicates data tracking the torso of the user (e.g., using body detector 310 as described above). In some examples, computer system 400 includes one or more components described above in relation to computer system 100 and/or device 200.

In the right portion of FIG. 4, computer system 400 tracks the first object and the second object via the camera modality and the microphone modality at a second point in time (e.g., using one or more techniques discussed in relation to FIG. 3) that is after the first point in time. In the right portion of FIG. 4, the first object is within the field of view of the one or more cameras and the second object is not within the field of view of the one or more cameras. Accordingly, in the right portion of FIG. 4, computer system 400 displays representation of first object 402 and does not display representation of second object 404 on display 408 of computer system 600. In the right portion of FIG. 4, with respect to the first object, computer system 400 assigns a 65% confidence weight to data received from the camera modality and a 35% confidence weight to the data received from the microphone modality. Further, in the right portion of FIG. 4, with respect to the tracking of the second object, computer system 400 assigns a 5% confidence weight to the data received from the microphone modality and a 95% confidence weight to the data received from the camera modality.

As explained above in the discussion of FIG. 3, with respect to the camera modality, the weight of the data from the camera modality is calculated using a machine learning network model. The machine learning network model uses a variety of factors in determining the weight of the data captured by the camera modality such as whether the tracked object is in the field-of-view of the camera, whether the tracked object is moving, and/or how fast the tracked object is moving. In the right portion FIG. 4, because the second object has moved and is now outside of the field of view of the one or more cameras, the machine learning network model assigns a confidence weight of 5% to the data from the camera modality (e.g., in contrast 70% confidence weight of the data from the camera modality in the left portion of FIG. 4). Further, as discussed above in the discussion of FIG. 3, the variance of the data captured by the microphone modality is used to calculate the confidence weight of the data captured by the microphone modality. In the right portion of FIG. 4 the audio coming from the second object is louder because the second object has moved away from computer system 400 (e.g., the second individual is talking louder (e.g., in comparison to the left portion of FIG. 4) to compensate for the increase in distance between the second individual and computer system 400). The variance in data between the right portion of FIG. 4 and the left portion of FIG. 4, causes the weight associated with the data from the microphone modality to change. Accordingly, in the right portion of FIG. 4, a confidence weight of 95% is assigned to the data captured by the microphone modality (e.g., in contrast to the 30% confidence weight of the data captured by the microphone modality in the left portion of FIG. 4). That is, computer system 400 dynamically adjusts the confidence weight of one or more modalities based the determined reliability of the data being captured by different modalities (e.g., at a particular instance in time and/or during a particular time interval). Although FIG. 4 is described using a camera modality and microphone modality, it is understood that other types of modalities could be used to perform similar techniques, such as an infrared modality, a vibration modality, an accelerometer modality, and/or an IMU modality. In some examples, the variance of the data captured by the microphone modality and the confidence weight assigned to the data captured by the microphone modality have an inverse relationship. In some examples, the variance of the data captured by the microphone modality and the confidence weight assigned to the data captured by the microphone modality have a direct relationship.

Figure 5:
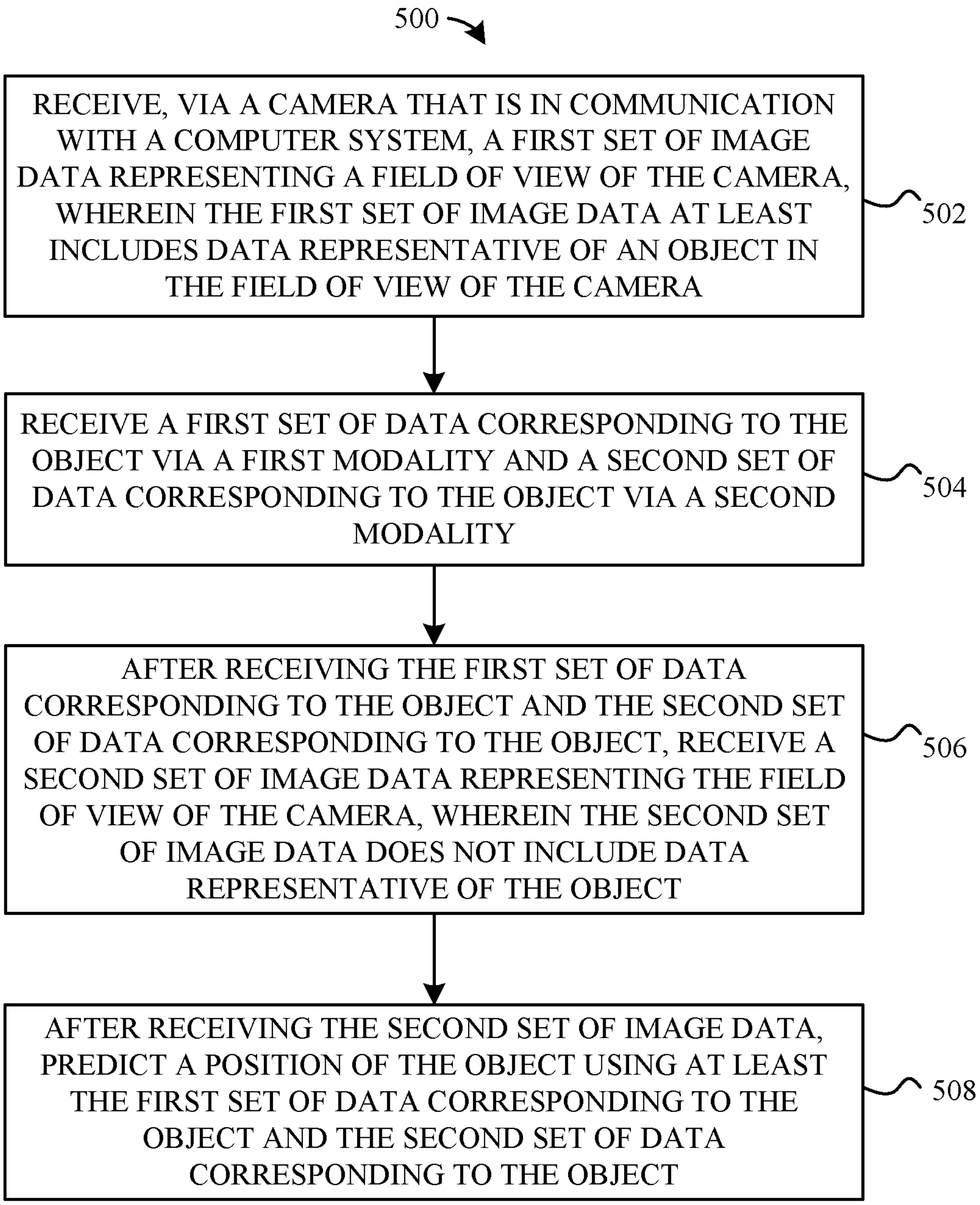
FIG. 5 is a flow diagram illustrating a method for tracking one or more objects, in accordance with some examples.

FIG. 5 is a flow diagram illustrating a method (e.g., method 500) for tracking one or more objects in accordance with some examples. Some operations in method 500 are, optionally, combined, the orders of some operations are, optionally, changed, and some operations are, optionally, omitted. In examples, method 500 is performed at a computer system, such as computer system 100, device 200, and/or the computer system described above in relation to FIGS. 3 and 4.

As described below, method 500 provides an intuitive way for tracking an object. Method 500 reduces the cognitive burden on a user for tracking an object, thereby creating a more efficient human-machine interface. For battery-operated computing devices, enabling a user to track an object faster and more efficiently conserves power and increases the time between battery charges.

At 502, the computer system receives, via a camera (e.g., one camera or one or more cameras) that is in communication with a computer system, a first set of image data (e.g., one or more images and/or one or more signals) representing a field of view of the camera (e.g., the camera captured the image and/or data representing a captured image), wherein the first set of image data at least includes data representative of an object in the field of view of the camera (e.g., the data representative of the object includes position data (e.g., data representing a cartesian coordinate system and/or within a spherical coordinate system)) (e.g., an object (e.g., an individual (e.g., person, animal, and/or physical object), a subject (e.g., person, animal, and/or physical object), and/or an object that is in motion) that is within the field of view of the camera at the time the camera captures the image).

At 504, the computer system receives (e.g., before, after, or while receiving the first set of image data) a first set of data corresponding to the object (e.g., data (e.g., positional data (e.g., positional data within a cartesian coordinate system and/or within a spherical coordinate system), velocity data, and/or depth data) representative of the position of the object while the object was in the field of view of the camera at a particular instance in time or while the object is outside of the field of view of the camera) via a first modality (e.g., auditory modality, depth modality, inertial measurement unit modality, or visual modality) and a second set of data corresponding to the object (e.g., data (e.g., positional (e.g., positional data within a cartesian coordinate system and/or within a spherical coordinate system) data, velocity data, and/or depth data) representative of the position of the object while the object was in the field of view of the camera at a particular instance in time or while the object is outside of the field of view of the camera) via a second modality (e.g., auditory modality, depth modality, inertial measurement unit modality, or visual modality) (e.g., that is different and/or distinct from the first modality).

At 506, after receiving the first set of data corresponding to the object and the second set of data corresponding to the object, the computer system receives a second set of image data representing the field of view of the camera (e.g., the second set of image data is different than and/or distinct from the first set of image data and/or the second set of image data was obtained at a period of time that is different from the period of time that the first set of image data was obtained). In some examples, the second set of image data does not include data representative of the object. In some examples the computer system receives the second set of image data after receiving the first set of data and after receiving the first set of image data.

At 508, after receiving the second set of image data (e.g., the object is not included in the image that is represented by the second set of image data, the object is not within the field of view of the camera when the camera captures the second set of image data, and/or the appearance of the object is obstructed from the camera), the computer system predicts a position (e.g., the current position and/or a real-time position) of the object (e.g., that is outside of the field of view of the camera, obstructed within the field of view of the object, and/or occluded in the field of view of the object) using at least the first set of data corresponding to the object and the second set of data corresponding to the object. In some examples, in accordance with a determination that the second set of image data representing the field of view of the camera includes data representative of the object, the computer system forgoes predicting the position of the object. In some examples, the first set of data and the second set of data includes position data from a first portion of the object and position data from a second portion of the object. In some examples, the predicting the position of the object includes using the first set of data or the second set of data.

In some examples, the first set of data and the second set of data are inputs into a filter (e.g., the first set of data and the second set of data are inputs (e.g., serve as inputs and/or inputs used to derive data that is input into the filter) into the same filter (e.g., and/or an algorithm that filters data)) that includes one or more selected from a group comprising: an extended Kalman filter; an unscented Kalman filter; and a particle filter. In some examples, the first set of data and the second set of data are inputs into two or more filters. In some examples, the first set of data and the second set of data are inputs into one type of filter.

In some examples, the first modality includes one or more selected from a group comprising a video modality (e.g., the video modality includes data regarding the size and/or direction of a surface (e.g., face, a body part, and/or a torso) of the object) (e.g., the video modality captures video data from one camera and/or multiple cameras (e.g., wide camera and/or ultra-wide camera)) (e.g., the output from the video modality includes positional components (e.g., x, y, and/or z positions) of the center of the bounding box and/or includes the size of the bounding box), audio modality (e.g., the audio modality includes direction data (e.g., data representative of the angle of a first audio source and/or a second audio source) (e.g., a spectrum of data and/or a set of grouped data) (e.g., elevation and/or azimuth data can be derived from the audio data captured by the audio modality)), an inertial measurement modality (e.g., data (e.g., data representative of the cameras speed, direction of movement, acceleration, force, and/or angular rate) captured via an inertial measurement unit within the camera), and a depth modality (e.g., depth data is inferred using an algorithm based on x and y components of a bounding box of the object and/or the size of a bounding box of the object). In some examples, the second modality includes one or more selected from the group comprising the video modality, the audio modality, the inertial measurement modality, or the depth modality. In some examples, the first modality and the second modality are the same type of modality. In some examples, the first modality and the second modality are different types of modalities. In some examples, the computer system predicts a positional characteristic of the object using the first set of data and the second set of data.

In some examples, predicting the position of the object includes, in accordance with a determination that the object is detected in a third set of image data (e.g., a determination is made (e.g., by the computer system and/or another computer system) that the object is within the field of view of the camera when the third set of image data is captured or a determination is made that the object is within the field of view of the camera and is not obstructed when the third set of image data is captured) (e.g., the second set of image data and/or another set of image data that was captured after the first set of image data) within a predetermined amount of time (e.g., 1-150 seconds) after receiving the first set of image data, wherein the third set of image is different from the first set of image data, using a first set of modalities (e.g., the first set of modalities includes the first modality, the second modality, and a third modality) and in accordance with a determination that the object is not detected in the third set of image data (e.g., a determination is made (e.g., by the computer system and/or another computer system) that the object is not within the field of view of the camera or a determination that the object is within the field of view of the camera but is obstructed from the view of the camera) within the predetermined amount of time after receiving the first set of image data, using a second set of modalities that is different from the first set of modalities (e.g., the second set of modalities includes the first modality, the second modality, and a fourth modality). In some examples, the first set of modalities and/or the second set of modalities includes one type of modality. In some examples, the first set of modalities and/or the second set of modalities includes two or more types of modalities.

In some examples, the first set of modalities includes a video modality and an audio modality. In some examples, the video data from the video modality is captured from a different source (e.g., a type of device (e.g., a video camera or a photograph camera)) than audio data that is captured from the audio modality (e.g., the audio data is captured by a different device (e.g., a microphone and/or a sound capturing device) than the device that captures the video data).

In some examples, the first modality is a different type of modality than the second modality (e.g., first modality is a visual modality, depth modality, audio modality, or inertial measurement unit modality and the second modality is an audio modality, visual modality, depth modality, or inertial measurement unit modality). In some examples, in accordance with a determination that a first set of one or more criteria is satisfied (e.g., the computer system (or another computer system) does not detect the object for a predetermined amount of time (e.g., 1-120 seconds) and/or the computer system detects that the object is within the field of view of the camera) a first weight (e.g., a weight of confidence (e.g., a weight of confidence measured in a quantitative manner (e.g., measured as a percentage of confidence or in a decimal format) and/or a weight of importance) is assigned to the first set of data of the object and a second weight (e.g., a weight of confidence (e.g., a weight of confidence measured in a quantitative manner (e.g., measured as a percentage of confidence or in a decimal format) or a weight of importance) is assigned to the second set of data of the object. In some examples, the first weight is greater than the second weight. In some examples, in accordance with a determination that a second set of one or more criteria is satisfied (e.g., the second set of one or more criteria is different and/or distinct from the first set of one or more criteria) (e.g., the computer system determines that the object is within the field of view of the camera and/or the computer system does not detect the object for the predetermined amount of time (e.g., 1-120 seconds)) a third weight (e.g., a weight of confidence (e.g., a weight of confidence measured in a quantitative manner (e.g., measured as a percentage of confidence or in a decimal format) and/or a weight of importance) is assigned to the first set of data of the object. In some examples, the third weight is different from the first weight and a fourth weight (e.g., a weight of confidence (e.g., a weight of confidence measured in a quantitative manner (e.g., measured as a percentage of confidence or in a decimal format) or a weight of importance) is assigned to the second set of data of the object. In some examples, the fourth weight is greater than the third weight. In some examples, the fourth weight is different from the second weight. In some examples, in accordance with a determination that the first set of one or more criteria and the second set of one or more criteria are not satisfied, the computer system does not assign a respective weight to the first modality and the second modality. In some examples, the first weight, second weight, third weight, and fourth weight are dynamic (e.g., the computer system changes the value of the respective weights based on detected changes to the physical environment). In some examples, the third weight is assigned to the first set of data of the object without assigning the first weight to the first set of data. In some examples, the fourth weight is assigned to the second set of data of the object without assigning the second weight to the first set of data. In some examples, in accordance with a determination that a third set of one or more criteria is satisfied, the weight of the first set of data is changed and the weight of the second set of data is not changed. In some examples, in accordance with a determination that a fourth set of one or more criteria is satisfied, the weight of the second set of data is changed and the weight of the first set of data is not changed. In some examples, the first set of one or more criteria and/or the second set of one or more criteria includes a criterion that is satisfied when a determination is made that the variance of data that is captured from an audio modality changes. In some examples, the first set of one or more criteria and/or the second set of one or more criteria is satisfied based on changes that occur with respect to the first modality and the second modality, where the changes and the respective weights assigned to each modality are independent of each other.

In some examples, the first modality and the second modality are different types of modalities. In some examples, predicting the position of the object includes predicting a first positional characteristic of the object (e.g., direction of movement, speed, and/or size) using the first set of data; and predicting a second positional characteristic of the object (e.g., direction of movement, speed, and/or size) using the second set of data. In some examples, the first positional characteristic is different from the second positional characteristic of the object. In some examples, the first set of data is used to predict the first positional characteristic of the object and the second positional characteristic of the object. In some examples, the second set of data is used to predict the first positional characteristic of the object and the second positional characteristic of the object. In some examples, predicting the first positional characteristic of the object includes using the first set of data and the second set of data.

In some examples, in accordance with a determination that data representative of the first portion of the object is not included in the first set of image data (e.g., the first portion of the object is occluded by another object or the first portion of the object is not within the angular range of the field of view of the camera) and that data representative of the second portion of the object is included in the first set of image data, predicting the position of the object includes using a first set of information (e.g., information from the bounding box of the head and/or top half of the subject) corresponding to the first set of data without using a second set of information (e.g., information from the bounding box of the torso and/or bottom half of the subject) corresponding to the second set of data (e.g., the first set of data and the second set of data include data from a bounding box of the second portion of the object and/or from the object itself). In some examples, in accordance with a determination that data representative of the second portion of the object is not included in the first set of image data and that data representative of the first portion of the object is included in the first set of image data, (e.g., the second portion of the object is occluded by another object or the second portion of the object is not within the angular range of the field of view of the camera), predicting the position of the object includes using a second set of information corresponding to the first set of data without using the first set of information corresponding to the second set of data (e.g., the first set of data and the second set of data include data from a bounding box of the first portion of the object and/or from the object itself). In some examples, in accordance with a determination that the first portion of the object is not included in the first set of image data and/or the second portion of the object is included in the first set of image data, predicting the position of the object includes using the first set of information corresponding the first set of data and a first set of information corresponding to the second set of data. In some examples, in accordance with a determination that the second portion of the object is not included in the first set of image data and/or the first portion of the object is included in the first set of image data, predicting the position of the object includes using the second set of information corresponding to the first set of data and a second set of information corresponding to the second set of data.

In some examples, the first set of data includes a first set of position data (e.g., data corresponding to the position of the object relative to the computer system, data corresponding to the position of the object relative to a different object, and/or data corresponding to the position of the object within a spherical coordinate system or a cartesian coordinate system) corresponding to the object. In some examples, the second set of data includes a second set of position data (e.g., data corresponding to the position of the object relative to the computer system and/or data corresponding to the position of the object relative to a different object and/or data corresponding to the position of the object within a spherical coordinate system or a cartesian coordinate system) corresponding to the object. In some examples, the first set of position data is different from the second set of position data (e.g., include a different type of data than, includes more data and/or less data than, and/or includes a different representation of data than).

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from multiple modalities to improve the tracking of an object. The present disclosure contemplates that in some instances, the gathered data can include personal information data that uniquely identifies or can be used to contact or locate a specific person. Such personal information data can include the future position data of an individual, historical position data of an individual, the identification data of an individual, movement data of an individual, demographic data, location-based data, or any other identifying information.

The present disclosure recognizes that the use of such personal information data, in the present technology, can be used to the benefit of users. For example, the personal information data can be used to change how a device tracks the movement of a person and/or individuals around the person. Accordingly, use of such personal information data enables more accurate tracking techniques. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of image capture, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, tracking information can be displayed to users by inferring the position of objects based on non-personal information data or a bare minimum amount of personal information, such as the content being requested by the device associated with a user or other non-personal information.

What is claimed is:

1. A method, comprising:

receiving, via a camera that is in communication with a computer system, a first set of image data representing a field of view of the camera, wherein the first set of image data at least includes data representative of an object in the field of view of the camera;

receiving a first set of data corresponding to the object via a first modality and a second set of data corresponding to the object via a second modality, wherein the first modality is a different type of modality than the second modality;

after receiving the first set of data corresponding to the object and the second set of data corresponding to the object, receiving a second set of image data representing the field of view of the camera, wherein the second set of image data does not include data representative of the object; and after receiving the second set of image data, predicting a position of the object, wherein predicting the position of the object includes:

in accordance with a determination that a first set of one or more criteria is satisfied:

assigning a first weight to the first set of data of the object;

assigning a second weight to the second set of data of the object, wherein the first weight is greater than the second weight; and in accordance with a determination that a second set of one or more criteria is satisfied:

assigning a third weight to the first set of data of the object, wherein the third weight is different from the first weight; and assigning a fourth weight to the second set of data of the object, wherein the fourth weight is greater than the third weight, wherein the fourth weight is different from the second weight, and wherein the second set of one or more criteria is different from the first set of one or more criteria.

2. The method of claim 1, wherein the first set of data and the second set of data are inputs into a filter that includes one or more selected from a group comprising:

an extended Kalman filter;

an unscented Kalman filter; and a particle filter.

3. The method of claim 1, wherein the first modality includes one or more selected from a group comprising a video modality, audio modality, an inertial measurement modality, and a depth modality, and wherein the second modality includes one or more selected from the group comprising the video modality, the audio modality, the inertial measurement modality, or the depth modality.

4. The method of claim 1, wherein predicting the position of the object includes:

in accordance with a determination that the object is detected in a third set of image data within a predetermined amount of time after receiving the first set of image data, wherein the third set of images is different from the first set of image data, using a first set of modalities; and in accordance with a determination that the object is not detected in the third set of image data within the predetermined amount of time after receiving the first set of image data, using a second set of modalities that is different from the first set of modalities.

5. The method of claim 4, wherein the first set of modalities includes a video modality and an audio modality.

6. The method of claim 1, wherein predicting the position of the object includes:

predicting a positional characteristic of the object using the first set of data and the second set of data.

7. The method of claim 1, wherein the object includes a first portion and a second portion, wherein:

in accordance with a determination that data representative of the first portion of the object is not included in the first set of image data and that data representative of the second portion of the object is included in the first set of image data, predicting the position of the object includes using a first set of information corresponding to the first set of data without using a second set of information corresponding to the second set of data; and in accordance with a determination that data representative of the second portion of the object is not included in the first set of image data and that data representative of the first portion of the object is included in the first set of image data, predicting the position of the object includes using a second set of information corresponding to the first set of data without using the first set of information corresponding to the second set of data.

8. The method of claim 1, wherein the first set of data includes a first set of position data corresponding to the object, and wherein the second set of data includes a second set of position data corresponding to the object.

9. A non-transitory computer-readable storage medium storing one or more programs configured to be executed by one or more processors of a computer system, the one or more programs including instructions for:

receiving, via a camera that is in communication with a computer system, a first set of image data representing a field of view of the camera, wherein the first set of image data at least includes data representative of an object in the field of view of the camera;

receiving a first set of data corresponding to the object via a first modality and a second set of data corresponding to the object via a second modality, wherein the first modality is a different type of modality than the second modality;

after receiving the first set of data corresponding to the object and the second set of data corresponding to the object, receiving a second set of image data representing the field of view of the camera, wherein the second set of image data does not include data representative of the object; and after receiving the second set of image data, predicting a position of the object, wherein predicting the position of the object includes:

in accordance with a determination that a first set of one or more criteria is satisfied:

assigning a first weight to the first set of data of the object;

assigning a second weight to the second set of data of the object, wherein the first weight is greater than the second weight; and in accordance with a determination that a second set of one or more criteria is satisfied:

assigning a third weight to the first set of data of the object, wherein the third weight is different from the first weight; and assigning a fourth weight to the second set of data of the object, wherein the fourth weight is greater than the third weight, wherein the fourth weight is different from the second weight, and wherein the second set of one or more criteria is different from the first set of one or more criteria.

10. A computer system, comprising:

one or more processors; and memory storing one or more programs configured to be executed by the one or more processors, the one or more programs including instructions for:

receiving, via a camera that is in communication with a computer system, a first set of image data representing a field of view of the camera, wherein the first set of image data at least includes data representative of an object in the field of view of the camera;

receiving a first set of data corresponding to the object via a first modality and a second set of data corresponding to the object via a second modality, wherein the first modality is a different type of modality than the second modality;

after receiving the first set of data corresponding to the object and the second set of data corresponding to the object, receiving a second set of image data representing the field of view of the camera, wherein the second set of image data does not include data representative of the object; and after receiving the second set of image data, predicting a position of the object, wherein predicting the position of the object includes:

in accordance with a determination that a first set of one or more criteria is satisfied:

assigning a first weight to the first set of data of the object;

assigning a second weight to the second set of data of the object, wherein the first weight is greater than the second weight; and in accordance with a determination that a second set of one or more criteria is satisfied:

assigning a third weight to the first set of data of the object, wherein the third weight is different from the first weight; and assigning a fourth weight to the second set of data of the object, wherein the fourth weight is greater than the third weight, wherein the fourth weight is different from the second weight, and wherein the second set of one or more criteria is different from the first set of one or more criteria.

11. The non-transitory computer-readable storage medium of claim 9, wherein the first set of data and the second set of data are inputs into a filter that includes one or more selected from a group comprising:

an extended Kalman filter;

an unscented Kalman filter; and a particle filter.

12. The non-transitory computer-readable storage medium of claim 9, wherein the first modality includes one or more selected from a group comprising a video modality, audio modality, an inertial measurement modality, and a depth modality, and wherein the second modality includes one or more selected from the group comprising the video modality, the audio modality, the inertial measurement modality, or the depth modality.

13. The non-transitory computer-readable storage medium of claim 9, wherein predicting the position of the object includes:

in accordance with a determination that the object is detected in a third set of image data within a predetermined amount of time after receiving the first set of image data, wherein the third set of images is different from the first set of image data, using a first set of modalities; and in accordance with a determination that the object is not detected in the third set of image data within the predetermined amount of time after receiving the first set of image data, using a second set of modalities that is different from the first set of modalities.

14. The non-transitory computer-readable storage medium of claim 13, wherein the first set of modalities includes a video modality and an audio modality.

15. The non-transitory computer-readable storage medium of claim 9, wherein predicting the position of the object includes:

predicting a positional characteristic of the object using the first set of data and the second set of data.

16. The non-transitory computer-readable storage medium of claim 9, wherein the object includes a first portion and a second portion, wherein:

in accordance with a determination that data representative of the first portion of the object is not included in the first set of image data and that data representative of the second portion of the object is included in the first set of image data, predicting the position of the object includes using a first set of information corresponding to the first set of data without using a second set of information corresponding to the second set of data; and in accordance with a determination that data representative of the second portion of the object is not included in the first set of image data and that data representative of the first portion of the object is included in the first set of image data, predicting the position of the object includes using a second set of information corresponding to the first set of data without using the first set of information corresponding to the second set of data.

17. The non-transitory computer-readable storage medium of claim 9, wherein the first set of data includes a first set of position data corresponding to the object, and wherein the second set of data includes a second set of position data corresponding to the object.

18. The computer system of claim 10, wherein the first set of data and the second set of data are inputs into a filter that includes one or more selected from a group comprising:

an extended Kalman filter;

an unscented Kalman filter; and a particle filter.

19. The computer system of claim 10, wherein the first modality includes one or more selected from a group comprising a video modality, audio modality, an inertial measurement modality, and a depth modality, and wherein the second modality includes one or more selected from the group comprising the video modality, the audio modality, the inertial measurement modality, or the depth modality.

20. The computer system of claim 10, wherein predicting the position of the object includes:

in accordance with a determination that the object is detected in a third set of image data within a predetermined amount of time after receiving the first set of image data, wherein the third set of images is different from the first set of image data, using a first set of modalities; and in accordance with a determination that the object is not detected in the third set of image data within the predetermined amount of time after receiving the first set of image data, using a second set of modalities that is different from the first set of modalities.

21. The computer system of claim 20, wherein the first set of modalities includes a video modality and an audio modality.

22. The computer system of claim 10, wherein predicting the position of the object includes:

predicting a positional characteristic of the object using the first set of data and the second set of data.

23. The computer system of claim 10, wherein the object includes a first portion and a second portion, wherein:

in accordance with a determination that data representative of the first portion of the object is not included in the first set of image data and that data representative of the second portion of the object is included in the first set of image data, predicting the position of the object includes using a first set of information corresponding to the first set of data without using a second set of information corresponding to the second set of data; and in accordance with a determination that data representative of the second portion of the object is not included in the first set of image data and that data representative of the first portion of the object is included in the first set of image data, predicting the position of the object includes using a second set of information corresponding to the first set of data without using the first set of information corresponding to the second set of data.

24. The computer system of claim 10, wherein the first set of data includes a first set of position data corresponding to the object, and wherein the second set of data includes a second set of position data corresponding to the object.

* * * * *